(No Model.)

J. J. BURT.
WHEEL FOR SINGLE TRACK RAILWAYS.

No. 496,293. Patented Apr. 25, 1893.

Witnesses,

Inventor,
John J. Burt.

UNITED STATES PATENT OFFICE.

JOHN JAMES BURT, OF TRES PINOS, ASSIGNOR OF ONE-HALF TO M. P. MINOR, OF SAN FRANCISCO, CALIFORNIA.

WHEEL FOR SINGLE-TRACK RAILWAYS.

SPECIFICATION forming part of Letters Patent No. 496,293, dated April 25, 1893.

Application filed September 19, 1892. Serial No. 446,332. (No model.)

*To all whom it may concern:*

Be it known that I, JOHN JAMES BURT, a citizen of the United States, residing at Tres Pinos, San Benito county, State of California, have invented an Improvement in Single-Track Railways; and I hereby declare the following to be a full, clear, and exact description of the same.

My invention relates to an improvement in single track railways. It is especially based upon the patent granted to David B. James, October 8, 1878, No. 208,738.

My improvement consists in forming the broad single wheels in two independent halves, one of which is movable upon the shaft, and in mounting the wheels upon swiveling trucks instead of swiveling each wheel independently, and in certain details of construction which will be more fully explained by reference to the accompanying drawings, in which—

Figure 1:
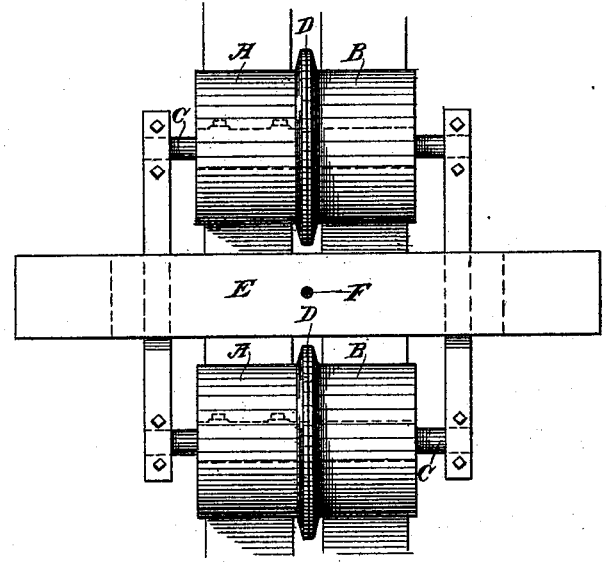
Figure 2:
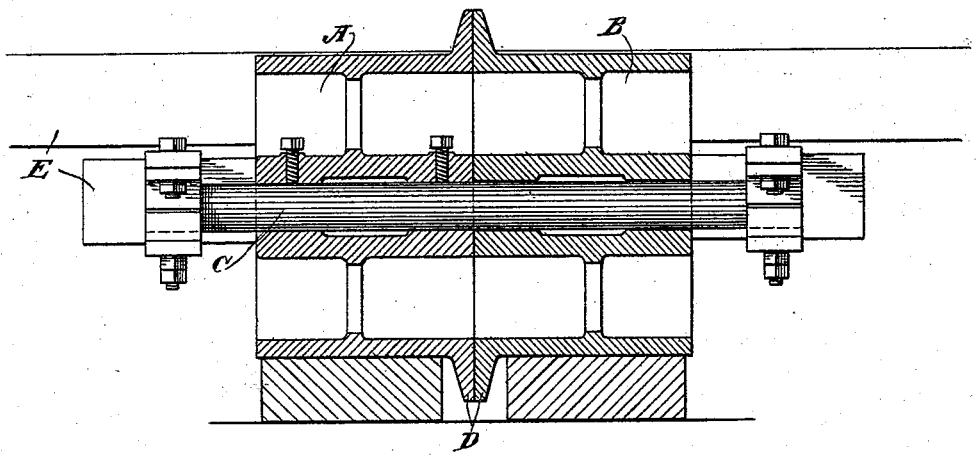

Figure 1 is a plan view of the truck and track. Fig. 2 is an end view of the same showing the front wheel in section.

In the former patent for a single track railway, the wheels were swiveled to turn on a vertical axis, and had a broad tread adapted to travel upon a single track, the tread and track being so broad as to prevent the car from upsetting, while a projecting central flange fitting a corresponding groove in the track retained the wheels in place. In practice it has been found that these wheels having such a great breadth of tread, produce a great deal of friction in passing around sharp curves, and I, therefore, make my wheels in two parts A and B. One of these parts, as A, is securely keyed, or fastened by set screws to the shaft C, while the other part B is allowed to turn loosely upon the shaft. The parts A and B are formed each one having one half of the projecting flange D formed upon one of its edges so that when the two are brought together they meet and form a complete flange in the center. Two of these wheels have their shafts journaled in a truck frame E on which is the king bolt or swivel pin at F upon which the body of the car, not here shown, is supported, so that the trucks at each end have an independent motion on curves in the manner of ordinary car trucks. By constructing the wheels with the two independent halves, one of which is movable, the movable portion will yield while the car is passing around short curves and will thus relieve the strain and friction which would otherwise take place on account of the great width of tread necessary to support and balance the car upon the single track.

Having thus described my invention, what I claim as new, and desire to secure by Letters Patent, is—

1. A vehicle constructed with wheels in a single central line with each other and adapted to travel upon a single track, said wheels being each composed of two cylindrical sections abutting together and having a central intermediate flange, one of said sections being fixed to the shaft and the other turning loosely thereon, substantially as herein described.

2. A vehicle for single track railways having the single line of wheels, each wheel being composed of two cylindrical sections having a broad tread upon the outer end, and having a half flange formed upon the inner meeting edges, said flanges abutting together on the central line, one of the cylindrical sections being fixed to the wheel shaft while the other turns loosely thereon, substantially as herein described.

3. A vehicle for single track railways having a truck frame adapted to support each end of the car, each truck frame having two wheels consisting of cylindrical sections mounted centrally upon shafts which are journaled at opposite sides of the truck, said wheel sections having flanges formed upon their inner meeting edges which abut together forming a wheel having a projecting two part central flange with a broad tread exterior to the flange upon each side, one of said sections being fixed to the wheel shaft and the other movable independently thereof upon the shaft, substantially as herein described.

In witness whereof I have hereunto set my hand.

JOHN JAMES BURT.

Witnesses:
M. HOGAN,
GEO. CRAIG.